March 22, 1960   V. L. STREETER   2,929,403
FLOW CONTROL WITH FLOAT TYPE NONLINEAR RESISTANCE
Filed Oct. 15, 1956
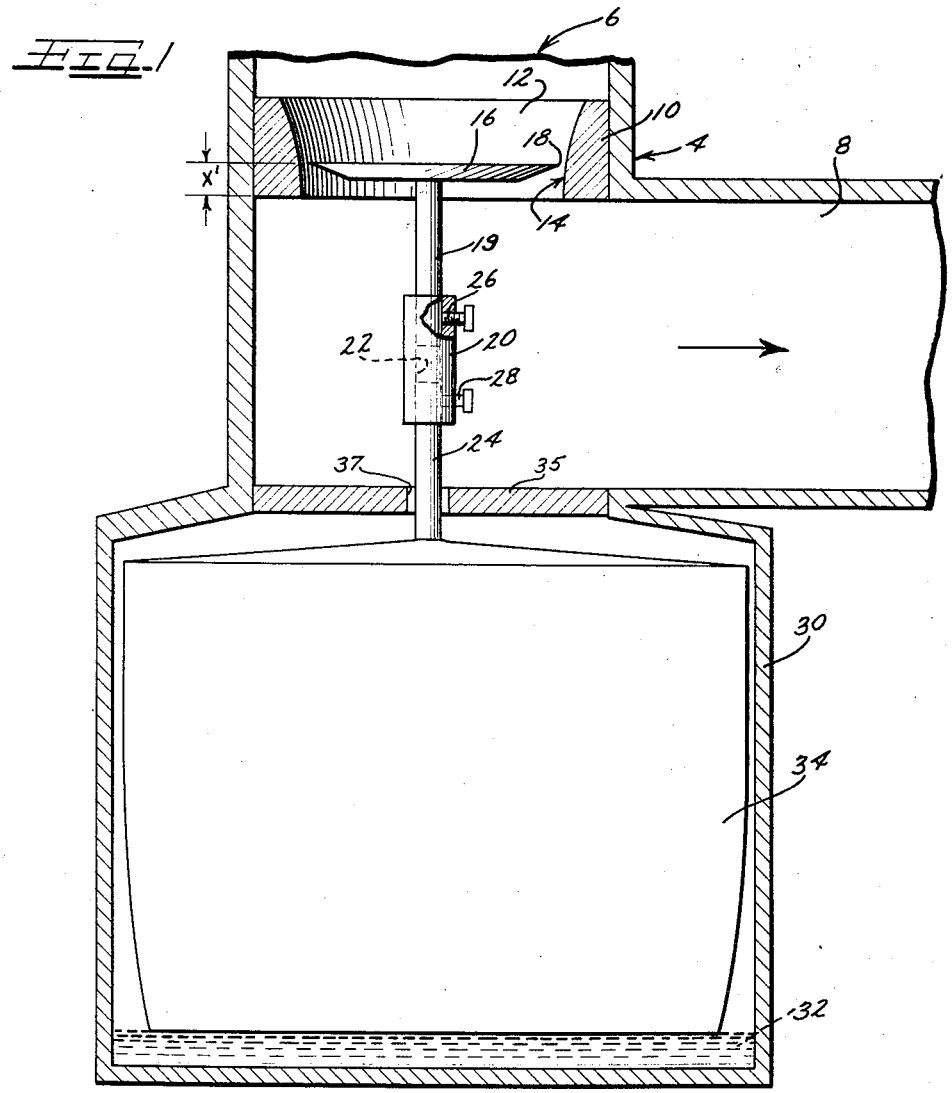
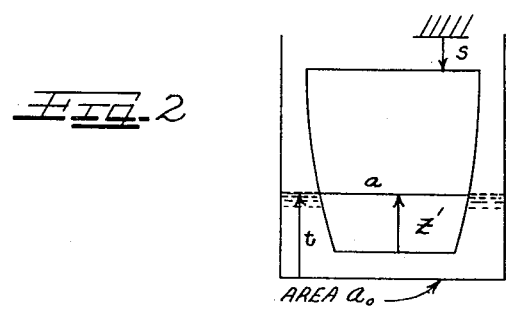
Inventor
VICTOR L. STREETER

United States Patent Office 2,929,403
Patented Mar. 22, 1960

2,929,403

FLOW CONTROL WITH FLOAT TYPE NONLINEAR RESISTANCE

Victor L. Streeter, Ann Arbor, Mich., assignor to The Dole Valve Company, Chicago, Ill., a corporation of Illinois Application October 15, 1956, Serial No. 615,785

5 Claims. (Cl. 137—517)

The present invention relates to improvements in adjustable flow controls, and more particularly relates to a flow control arrangement wherein a control valve is provided having a movable element with a non-linear positional backing supplied by a shaped float.

In the use of fluid flow control devices for controlling the flow of fluids and liquids such as water and the like, there is a need for controlling the flow to obtain a flow rate characteristic which will remain constant with variations in fluid pressure or head at the inlet to the device and which will maintain a constant flow rate with such variations. Flow control valves of this nature find considerable utility over varying ranges of use. In the control of the flow of water for household use, for automotive use, for industrial uses and various other applications, it is desirable to have a valve structure which is reliable and which will yield a constant flow rate irrespective of pressure drop across the valve. Further, it is desirable to provide a valve structure which is accurate and which is reliable and will not lose adjustment with use.

It is, therefore, an object of the invention to provide an improved flow control valve which will obtain uniform flow with fluctuations in pressure.

Another object is to provide an improved flow control device which will yield a constant flow with pressure fluctuations and which has instantaneous response and enhanced accuracy and reliability.

Another object of the invention is to provide a flow control having a movable valve member with an improved biasing means for supporting the valve member and controlling its position relative to an orifice.

A still further object of the invention is to provide a non-linear support for a movable valve member used in a flow control wherein the non-linear support is provided by a float.

A still further object of the invention is to provide a float supported movable valve member operative as a flow control wherein the discharge setting can be easily adjusted.

A still further object of the invention is to provide a flow control having an orifice with a relatively movable valve member therein to control the cross-sectional flow area and having a floating backing member for the movable valve member which is designed to function in accordance with the non-linear resistance law $$F = F_0 e^{\frac{s \ln H}{Y_0}}$$

Another object of the invention is to provide a flow control having an orifice and a relatively movable valve member therein to adjustably control the cross-sectional flow opening wherein the movable member is connected to a float which is designed in accordance with the relationships $$z' = s + \frac{F_0}{a_0 \Delta \gamma}\left(e^{\frac{s \ln H}{Y_0}} - 1\right)$$

$$a = \frac{a_0}{1 + \frac{a_0 Y_0 \Delta \gamma}{F_0 \ln H} e^{-\frac{s \ln H}{Y_0}}}$$

whereby a non-linear resistance is provided for the movable valve member to obtain constant flow with varying head.

Another object of this invention is to provide a shaped float providing a non-linear resistance for controlling a movable member of a flow control valve having a profiled throat formed in accordance with the relationship $$x = \frac{2Y_0}{\ln H}\left\{\ln\left[2\sqrt{2}\frac{r_0 + \frac{t}{2}}{r'^2 - r_0^2}\frac{Y_0}{\ln H}\sqrt{1 - \sqrt{1 - \left(\frac{t \ln H}{Y_0}\right)^2}}\right] - \frac{1}{2}\left[1 - \sqrt{1 - \left(\frac{t \ln H}{Y_0}\right)^2}\right]\right\}$$

Other objects, features and advantages of the present invention will become more apparent with the complete disclosure of the invention in the following detailed description of the specification, claims and accompanying drawings in which:

Figure 1 is a partially diagrammatic presentation of a structure embodying the principles of the present invention; and Figure 2 is a schematic presentation of the non-linear float resistance with the dimensions indicated from which the design relationships are developed and disclosed.

As illustrated in the drawings and as will be described in detail, the disclosed preferred embodiment presents a flow control wherein an orifice member is provided having a surface of revolution to coact with a movable poppet disk to regulate the cross-sectional flow area through the orifice with changes in head of the fluid flow therethrough. The poppet is given a non-linear backing or support to control its position provided by a float housed in a chamber and resting in a fluid. The float is provided with a profile to provide the proper non-linear force displacement relationship.

As illustrated in Figure 1, the flow control has a housing 4 provided with an inlet 6 and an outlet 8, with the flow of fluid to be controlled entering at the inlet and being discharged at the outlet. Between the inlet and outlet is an orifice defining member 10 providing a central orifice or throat 12 therethrough. The orifice member has a specially shaped profiled face 14 to provide a throat between it and the movable poppet disk or head 16.

The disk is so designed as to have a knife-edge 18 which will provide a flow of suitable characteristics between it and the face 14 of the orifice without unnecessary flow loss factors.

The poppet disk 16 is supported on a stem 19 which is secured in an adjustable connector member 20. The connector member is in the form of a sleeve having a cylindrical opening 22 therethrough with the poppet stem projecting into the upper end of the cylindrical opening and a supporting rod 24 projecting into the lower end of the connecting member. The stem is held in place within the sleeve by a set screw 26 threaded radially into the sleeve to bear against the stem and secure it in its position within the sleeve. The rod 24 is also secured within the sleeve by a set screw 28 threaded radially into the sleeve and securing the post therein. It will be apparent that the position of the disk relative to the supporting rod and hence the float 34 may be readily adjustable in a vertical direction by loosening either of the set screws and moving the disk up or down relative to the rod and retightening the set screw in the adjusted position.

Beneath the housing 4 for the flow control is secured a tank or chamber 30 which contains the fluid 32 in which the float 34 is suspended. The float carries the rod 24 and moves up or down to provide a non-linear resistance or support for the poppet disk 16 with variations in pressure drop across the disk. The fluid 32 in the chamber 30 is illustrated in the preferred embodiment as being of mercury, although other forms of fluid may be utilized. At the top of the chamber is a plate 35 preventing direct contact engagement of the top of the float 34 by the fluid passing through the valve. A hole 37 is provided in the plate so that the rod 24 can move freely therethrough and so that the pressure on each side of the plate will be substantially the same.

The orifice and poppet combination is similar to that disclosed in my copending patent application "Adjustable Flow Control," Serial No. 446,867, filed July 30, 1954. The envelope or profile of the orifice is designed to avail movement of the poppet in accordance with the quadratic relationship between the flow and the head. The surface of revolution or the envelope of the orifice is constructed to follow the law $$C_d A = (C_d A)\min e^{\frac{z' \ln H}{2Y_0}} \quad (1)$$

It is to be understood that although the orifice member 10 is profiled and the poppet is thin edged, the construction could for certain purposes be altered with a thin orifice member and profiled poppet. Also the orifice could be constructed as the movable member with the poppet fixed in position.

The throat of the envelope is constructed in accordance with the relationship $$x = \frac{2Y_0}{\ln H}\left\{\ln\left[2\sqrt{2}\frac{r_0+\frac{l}{2}}{r'^2-r^2}\frac{Y_0}{\ln H}\sqrt{1-\sqrt{1-\left(\frac{l \ln H}{Y_0}\right)^2}}\right] -\frac{1}{2}\left[1-\sqrt{1-\left(\frac{l \ln H}{Y_0}\right)^2}\right]\right\} \quad (2)$$

For this poppet and orifice throat relationship, a non-linear support is provided for the movable valve member, shown as the poppet in this case. A float support is utilized for the movable valve member to obtain the non-linear resistance necessary. The displacement of the heavy liquid by a profiled float, moving vertically within the float chamber, provides the means of obtaining a force displacement that is exponential. The pressure drop across the poppet disk forces the float into the mercury causing it to rise along the sides of the float, thereby increasing the buoyant force. Also, by adjusting the length of the stem between the disk and the float, by the set screws 26 and 28 shown, or equivalent mechanical arrangements, the discharge setting of the flow control can be varied. The presence of water or other liquid flowing above the float and in contact with the mercury or other heavy liquid is taken into account by the calculations shown below. The weight of poppet disk, rod and float can be balanced by buoyant force of the flowing liquid on the float or by an extension of the bottom of the float into the heavy liquid. It will be understood, however, that the valve could be designed in accordance with the principles of my invention so as to have a fixed poppet and movable orifice in which case the profile of the orifice would have to be inverted. It will also be understood that a knife-edge orifice could be adopted with a profiled poppet. For convenience the disc or poppet will be described herein as movable and the orifice defining member as the shaped member. However, the scope of the invention and the scope of the claims are to be interpreted as covering the alternative arrangements.

In some instances it may be desirable to provide a flow meter. With the application of the principles of the present invention the structure can be modified to obtain a flow meter. The orifice member 10 is reversed in its position so that it has an increasing cross-sectional area in a downstream direction. The non-linear float backing for the poppet member will then permit it to move as a flow meter. The flow will be linearly proportional to the pressure drop across the poppet and by utilizing a device responsive to pressure differential, such as a manometer, and connecting it upstream and downstream of the valve, the flow can be read from a linear scale.

To calculate the cross-sectional area of the float in terms of elevation $z'$ above its bottom, reference is made to Figure 2 of the drawings. The non-linear resistance law in accordance with which the float backing performs is $$F = F_0 e^{\frac{s \ln H}{Y_0}} \quad (3)$$

where $s$ varies from zero to $Y_0$ and $F$ from $F_0$ to $F_0 H$. For a displacement, $\delta s$ of the float, a volume $a\delta s$ of liquid $\gamma_2$ is displaced and fills the annular space $(a_0-a)\delta t$. Let $\Delta\gamma = \gamma_2 - \gamma_1$, where $\gamma_2$ is specific weight of heavy liquid and $\gamma_1$ specific weight of flowing liquid. The buoyant force due to displacement $\delta s$ is then $$\delta F = (\delta t + \delta s) a \Delta\gamma \quad (4)$$

Using the continuity equation $$a\delta s = (a_0 - a)\delta t \quad (5)$$

the buoyant force change becomes $$\delta F = \delta s\left(\frac{a}{a_0-a}+1\right) a \Delta\gamma = \delta s \frac{a a_0}{a_0-a}\Delta\gamma \quad (6)$$

differentiating Eq. 3

$$\delta F = \frac{F_0 \ln H}{Y_0} e^{\frac{s \ln H}{Y_0}} \delta s \quad (7)$$

and equating values of $\delta F$ in (6) and (7)

$$\frac{a a_0}{a_0-a}\Delta\gamma = \frac{F_0 \ln H}{Y_0} e^{\frac{s \ln H}{Y_0}} \quad (8)$$

Solving for $a$ $$a = \frac{a_0}{1+\frac{a_0 Y_0 \Delta\gamma}{F_0 \ln H}e^{-\frac{s \ln H}{Y_0}}} \quad (9)$$

Equation 9 yields the cross-sectional area of the float in terms of $s$. It must now be related to $z'$. For displacement $\delta s$ $$\delta z' = \delta s + \delta t \quad (10)$$

and from Eq. 5

$$\delta z' = \frac{\delta s a_0}{a_0 - a} \quad (11)$$

Eliminating $a$ in Eq. 6, 7 and 11

$$dz' = \left(1+\frac{F_0 \ln H}{a_0 Y_0 \Delta\gamma}e^{\frac{s \ln H}{Y_0}}\right)ds \quad (12)$$

Integrating $$z' = s + \frac{F_0}{A_0 \Delta\gamma}e^{\frac{s \ln H}{Y_0}} + \text{constant}$$

Let $z' = 0$ when $s = 0$, then $$z' = s + \frac{F_0}{a_0 \Delta\gamma}\left(e^{\frac{s \ln H}{Y_0}} - 1\right) \quad (13)$$

Equations 9 and 13 permit $a$ and $z'$ to be computed in terms of the parameter $s$.

As an example of a float which may be used in accordance with the principles of the invention, the following example is given. This example has not been corrected for capillarity.

*Example*

$r_0 = 1.0''$
$h_0 = 2.5'$
$H = 10$
$Y_0 = \frac{1}{4}''$ $$F_0 = 62.4 \frac{\pi}{144} \times 2.5 \; 3.40 \text{ lb.}$$

$$\frac{\ln H}{Y_0} = 9.212/\text{in.}$$

$$F = 3.4 e^{9.212 s}$$

$\Delta\gamma = 2 - \gamma_1 = 786\#/\text{ft.}^3 = 0.455\#\text{in.}^3$ area of float chamber $= 20$ in.$^2$ Then from Eq. 9.

$$a = \frac{20}{1 + \frac{0.2906}{9.2125}} \quad a = \frac{20}{1 + 0.2906 e^{-9.212 s}}$$

$$z' = s + 0.37375(e^{9.212 s} - 1)$$

The following chart indicates various related values for the float:

| in. s | in. a | in. z' |
|---|---|---|
| 0 | 15.49 | 0 |
| 0.05 | 16.90 | 0.269 |
| 0.10 | 17.92 | 0.665 |
| 0.15 | 18.64 | 1.257 |
| 0.20 | 19.11 | 2.184 |
| 0.25 | 19.44 | 3.611 |

In the mathematical definition for the structure, symbols used have the following general meaning:

$A$ = area of opening between disk and throat
$C_d$ = discharge coefficient
$e$ = base of natural logarithms
$F$ = pressure of force on disk
$F_0$ = minimum design force on disk
$H$ = ratio of maximum fluid head to minimum fluid head
$h$ = head drop across disk
$h_0$ = minimum design head loss across disk
$\ln$ = natural logarithm
$r$ = radial coordinate of throat profile
$r'$ = minimum throat radius
$r_0$ = disk radius
$t = r - r_0$
$\gamma$ = unit weight of the flowing fluid or the liquid
$x$ = axial coordinate of throat profile
$x'$ = position of disk in throat
$Y_0$ = displacement of float due to head change from $h_0$ to $h_0 H$
$s$ = displacement of float from minimum design head position
$a$ = area of the float
$a_0$ = area of the float chamber
$z$ = depth of the liquid It will be recognized by those skilled in the art, from the above teachings of my invention, that an alternative form may be provided wherein the float has vertical surfaces and the float chamber has side walls which curve inwardly. Thus the amount that the liquid will rise on the side of the float varies non-linearly with the force on the valve. The side walls of the chamber will follow the same shape relationships as disclosed for the shaped float.

Thus it will be seen that I have provided an improved non-linear resistance for the flow control valve which is developed in accordance with the laws given. The valve in combination with the float is capable of rapid response and provides an accurate reliable flow control avoiding disadvantages present in flow control valves heretofore used.

I have, in the drawings and specification, presented a detail disclosure of the preferred embodiments of my invention, but it is to be understood that I do not intend to limit the invention to the specific form disclosed but intend to cover all modifications, changes and alternative constructions and methods falling within the scope of the principles taught by my invention.

I claim as my invention:

1. A fluid flow control device comprising a valve housing having an inlet and an outlet, an orifice defining member forming a throat between said inlet and outlet defining a flow path therebetween, a poppet disk member within said orifice member with one of said members movable relative to the other to vary the cross-sectional flow area through the orifice, one of said members having a shaped surface contoured to vary the flow area when said movable member is displaced and a non-linear support for the movable means including a float attached to the movable member and supported in a body of liquid, the float providing a non-linear resistance in accordance with the law $$F = F_0 \, e^{\frac{s \ln H}{Y_0}}$$

wherein $F$ is the pressure force on the disk
$F_0$ is the minimum design force on the disk
$e$ is the base of natural logarithms
$s$ is the displacement of float from minimum design head position
$\ln$ is the natural logarithm
$H$ is the ratio of maximum fluid head to minimum fluid head
$h_0$ is the minimum design head loss across disk, and
$Y_0$ is the displacement of float due to head change from $h_0$ to $h_0 H$.

2. A fluid flow control device comprising a valve housing having an inlet and an outlet, an orifice defining member forming a throat between said inlet and outlet defining a flow path therebetween, a poppet disk member within said orifice member with one of said members movable relative to the other to vary the cross-sectional flow area through the orifice, one of said members having a shaped surface contoured to vary the flow area when said movable member is displaced, and a non-linear support for the movable means including a float attached to the movable member and supported in a body of liquid and a float chamber for containing said liquid, the non-linear support having characteristics in accordance with the laws $$a = \frac{a_0}{1 + \frac{a_0 Y_0 \Delta\gamma}{F_0 \ln H} e^{\frac{-s \ln H}{Y_0}}}$$

and $$\Xi = s + \frac{F_0}{a_0 \Delta\gamma} e^{\frac{s \ln H}{Y_0}} - 1$$

wherein $a$ is the area of the float
$a_0$ is the area of the float chamber
$s$ is the displacement of float from minimum design head position
$\ln$ is the natural logarithm
$H$ is the ratio of maximum fluid head to minimum fluid head
$h_0$ is the minimum design head loss across disk
$Y_0$ is the displacement of float due to head change from $h_0$ to $h_0 H$
$\gamma$ is the unit weight of the liquid
$F_0$ is the minimum design force on disk
$\Xi$ is the depth of liquid 3. A fluid flow control device comprising a valve housing having an inlet and an outlet, orifice defining means in said housing forming a throat between the inlet and outlet providing a flow path therebetween, valve poppet disk means within the orifice with one of said means movable relative to the other to vary the cross-section flow area with changes in pressure head at this inlet, one of said means having a face profile contoured to vary the flow area between said means when the movable means is moved, and a non-linear support for the movable means including a float supported in a liquid chamber with the float shaped to provide a non-linear resistance for the movable valve member, said face profile of the valve member contoured to support the movable member in accordance with the relationship of $$C_d A = (C_d A)_{min} \; e^{\frac{x' \ln H}{2Y_0}}$$

wherein $C_d$ is the discharge coefficient
$A$ is the area of the opening between the disk and the orifice sides
$e$ is the base of natural logarithms
$x'$ is the position of disk in throat
$\ln$ is the natural logarithm
$H$ is the ratio of maximum fluid head to minimum fluid head
$Y_0$ is the displacement of float due to head change from $h_0$ to $h_0 H$, and
$h_0$ is the minimum design head loss across the disk 4. A fluid flow control device comprising a valve housing having an inlet and an outlet, orifice defining means in said housing between the inlet and outlet providing a throat for a flow path therebetween, valve poppet disk means within the orifice with one of said means movable relative to the other to vary the cross-section flow area with changes in pressure head at this inlet, one of said means having a face profile contoured to vary the flow area between said means when the movable means is moved, and a non-linear support for the movable means including a float supported in a fluid chamber with the float shaped to provide a non-linear resistance for the movable valve member, said face profile of the valve member contoured in accordance with the relationship of $$x = \frac{2Y_0}{\ln H}\left\{ \ln\left[ 2\sqrt{2}\frac{r_0 + \frac{t}{2}}{r'^2 - r_0^2}\frac{Y_0}{\ln H}\sqrt{1 - \sqrt{1 - \left(\frac{t \ln H}{Y_0}\right)^2}}\right] - \frac{1}{2}\left[1 - \sqrt{1 - \left(\frac{t \ln H}{Y_0}\right)^2}\right]\right\}$$

wherein $x$ is the axial coordinate of throat profile
$Y_0$ is the displacement of float due to head change from $h_0$ to $h_0 H$
$h_0$ is the minimum design head loss across disk
$\ln$ is the natural logarithm
$H$ is the ratio of maximum fluid head to minimum fluid head
$r_0$ is the disk radius
$r'$ is the minimum throat radius
$t$ is $r - r_0$, and
$Y_0$ is the displacement of float due to head change from $h_0$ to $h_0 H$.

5. A fluid flow control device comprising a valve housing having an inlet and an outlet, an orifice defining means within said housing providing throat for a flow path therethrough, a poppet disk means within said orifice and movable relative thereto to vary the cross-sectional flow opening, one of said valve members having a face profile to vary the cross-sectional flow area with relative movement of the poppet disk, the face profile formed in accordance with the relationship $$x = \frac{2Y_0}{\ln H}\left\{ \ln\left[ 2\sqrt{2}\frac{r_0 + \frac{t}{2}}{r'^2 - r_0^2}\frac{Y_0}{\ln H}\sqrt{1 - \sqrt{1 - \left(\frac{t \ln H}{Y_0}\right)^2}}\right] - \frac{1}{2}\left[1 - \sqrt{1 - \left(\frac{t \ln H}{Y_0}\right)^2}\right]\right\}$$

a float connected to the poppet to provide a non-linear resistance to movement of the poppet disk with variations in fluid head, and a supporting chamber for said float containing a liquid, said float having a liquid engaging surface developed in accordance with the relationships $$a = \frac{\frac{F_0 \ln H}{Y_0 \Delta \gamma} e^{\frac{s \ln H}{Y_0}}}{1 + \frac{F_0 \ln H}{a_0 Y_0 \Delta \gamma} e^{\frac{s \ln H}{Y_0}}}$$

and $$z' = s + \frac{F_0}{a_0 \Delta \gamma}\left( e^{\frac{s \ln H}{Y_0}} - 1 \right)$$

whereby a non-linear resistance is provided to control movement of the poppet disk and a uniform flow is obtained through the flow control device with variations in head wherein $x$ is the axial coordinate of throat profile
$Y_0$ is the displacement of float due to head change from $h_0$ to $h_0 H$
$h_0$ is the minimum design head loss across disk
$\ln$ is the natural logarithm
$H$ is the ratio of maximum fluid head to minimum fluid head
$r_0$ is the disk radius
$r'$ is the minimum throat radius
$t$ is $r - r_0$
$a$ is the area of the float
$a_0$ is the area of the float chamber
$F_0$ is the minimum design force on disk
$\gamma$ is the unit weight of the liquid
$e$ is the base of natural logarithms
$s$ is the displacement of float from minimum design head position.

References Cited in the file of this patent

UNITED STATES PATENTS

| | | |
|---|---|---|
| 1,904,337 | Turner | Apr. 18, 1933 |
| 1,921,145 | Albright | Aug. 8, 1933 |
| 2,619,114 | Conkling | Nov. 25, 1952 |
| 2,646,060 | Ponsar | July 21, 1953 |

FOREIGN PATENTS

| | | |
|---|---|---|
| 411,366 | France | of 1910 |
| 74,254 | Austria | Mar. 26, 1918 |